United States Patent Office 3,241,956
Patented Mar. 22, 1966

3,241,956
ELECTRIC-DISCHARGE SINTERING
Kiyoshi Inoue, Tokyo, Japan
(100 Sakato, Kawasaki, Kanagawa, Japan)
Filed Oct. 29, 1963, Ser. No. 319,821
Claims priority, application Japan, May 30, 1963,
38/28,052
8 Claims. (Cl. 75—226)

This application is a continuation-in-part of my copending application Serial No. 247,387, filed December 26, 1962.

My present invention relates to the electric-discharge sintering of discrete bodies (e.g. metallic particles with or without admixture of other particulate substances) and, more particularly, to an improved method of sintering discrete bodies and an apparatus for carrying out the improved method. In my copending application Ser. No. 247,387, I have pointed out that earlier-known sintering techniques could generally be classified in three categories, depending upon the specific procedures used. The principal method of earlier sintering operations involved the heating, usually in electric or gas furnaces, but also by induction or dielectric processes, of the mass of particles which was subjected to extremely high pressure, generally on the order of several tons per cm.² to effect a welding of the particles together at the elevated pressure. It has also been proposed prior to this copending application to employ resistance-heating techniques requiring elevated pressure to obtain the desired welding effect and to make use of adhesives or fusion-promoting agents which permit the use of lower temperatures although high pressures were required for these methods as well.

In contradistinction, I disclose and claim in the aforementioned copending application a method of sintering discrete electrically conductive bodies and even certain nonconductive bodies together without the use of excess pressure and with sintering times substantially less than those practicable hitherto. Basically, the improved method involved the sintering together of the discrete bodies (e.g. a mass of metal particles or metal particles admixed with nonconductive particles) by disposing them in relatively ligth contacting relationship, i.e. under a mechanically applied pressure of at most 100 kg./cm.² but often as low as the pressure produced by the gravitational force resulting from the piling of the particles, and effecting a space discharge within the mass of particles so that, advantageously, an electrical spark develops between adjacent bodies. The surprising results obtainable in this manner are believed to derive from the fact that the spark discharge is capable of effecting a partial ionization of the particulate material at the mutually contacting surfaces of adjacent particles while simultaneously applying to these adjacent particles sufficient impulsive pressure, in addition to the static or mechanically applied pressure, to effect a firm fusion of the particles. Even if a true ionization of the material constituting the particles does not take place, the development of the spark discharge appears to result in the concentration of a sufficiently high temperature at the region of discharge so that an interdiffusion of the material constituting the contacting particles takes place under the impulsive pressure mentioned above. After an initial fusion resulting from the spark discharge, the bond is presumably further secured by the passage of electric current through the body without substantial development of sparking to provide a resistive or joule heating of the particles, the heat being concentrated at the limited zones of fusion previously produced so that a firm welding of each particle to those proximal thereto results. Thus, whereas earlier systems required pressures adapted to reduce the contact resistance among the particles constituting the mass to a minimum during the initial sintering stages so that maximum welding current could flow, the spark-discharge technique of my copending application Ser. No. 247,387 necessitates that the initial pressure be small so that the contact resistance be on the order of or greater than the initial resistance, the initial electric current thereby passing through the mass as a space discharge.

It should, however, be noted that this space-discharge-sintering method, while reducing sintering times manifold and increasing the variety of shapes which can be produced by sintering, and decreasing the basic costs of a sintering installation, was only satisfactory for producing relatively porous or low-density bodies. It appears that sintered bodies of high density were precluded in this method as a consequence of the initial spark-discharge welding which takes place at unusually low static pressures.

It is the principal object of the present invention to provide an improved method of producing relatively dense sintered bodies.

A further object of this invention is to extend the principles advanced in my copending application Ser. No. 247,387 to the efficient formation of sintered bodies having relatively low porosities.

Still another object of the present invention is to provide an apparatus for carrying out the improved technique.

These objects and others which will become apparent hereinafter are attained, in accordance with the present invention, by a method based upon the discovery that relatively dense sintered bodies can be produced when the relatively low mechanical pressure established during the spark-discharge fusion of the particles is strongly augmented concurrently with or subsequently to the termination of spark discharge. I have found that the initial mechanical pressure, which can result to a large part from the mere superposition of one particle upon another in the mass, should range between substantially 0.1 kg./cm.² and 5 kg./cm.² during the initial spark discharge so that the mass presents to the electric current the appearance or character of discrete particles in, at most, light-contacting relationship. As described in my above-identified copending application, the spark discharge results in a bridging of the particles of the metal, the particles thus being in a bonded state although having their centers of mass relatively far apart. It was contemplated, in accordance with the basic spark-discharge-sintering method, to maintain the electric current beyond the formation of metallic bridges between the particles so that the resulting joule or resistive heat, which is concentrated at the metallic bridges, can cause a further flow of metal toward the junctions between the particles and increase the rigidity of the bond. While applicant does not desire to be bound by any theory, it may be argued that this passage of additional current does not materially alter the spacing of the centers of mass of the adjacent particles, metal from the particles flowing toward the gap without any significant decrease in the volume occupied by the particles at the moment the metallic bridges are formed. This hypothesis is supported by the fact that, upon initial formation of the conductive bridges (during spark discharge), there is a material shrinkage of the volume occupied by the particle mass, the additional shrinkage, resulting from further passage of electric current, being relatively small when compared with the original shrinkage.

It has been found that highly dense sintered bodies and, in fact, bodies whose density approaches above 90% of the density of the solid metal, can be produced by applying a relatively elevated pressure ranging between substantially 6 kg./cm.$^2$ and 1000 kg./cm.$^2$ subsequent to the formation of conductive bridges between the particles and while the particles, at least at their interfacial regions, are at a temperature at which they are plastically deformable under the elevated pressure. In this connection it may be noted that this increase in the pressure applied to the mass of sintered particles can take place concurrently with complete termination of the passage of electric current through the mass or just before such termination but, in any event, should be effected, in accordance with the principles of the present invention, subsequent to the formation of conductive bridges between the particles of at least a portion of the mass. It is clear, therefore, that it may be desirable under certain circumstances to create a limited number of conductive bridges between the particles but not establish bridges between the adjacent particles of the entire mass at the point at which the elevated pressure is applied. Surprisingly, the application of elevated pressures subsequent to or concurrently with the formation of metal bridges between the particles permits the attainment of sintered bodies whose density approaches 99% of the density of the solid metal.

According to a further feature of the present invention, the electric current employed to effect the sintering of the particles comprises at least two components having specific functions improving the particle-to-particle bond produced by the discharge and subsequent thereto. Thus the electric current supplied between the electrodes intermediate which the relatively loose mass of particles is disposed, includes a relatively low-frequency or direct-current component adapted to generate efficiently the joule or resistive heat and consolidate the particles upon the formation of the conductive bridge therebetween, a relatively high frequency for the resonance-activation of the crystal lattice of the particles, and an elevated frequency for the production of spark discharge; the latter can, of course, be the same high-frequency component generating the spark discharge. The use of a resonance frequency is disclosed in my copending application Ser. No. 254,360 filed January 28, 1963, and now abandoned, to strain the crystal lattice and permit, on the one hand, ready ionization of the substance at the interface between the particles and, on the other hand, rapid diffusion of an ion into the crystal lattice, thereby ensuring a monolithic bond and greatly improving the density of the sintered body. Advantageously, the resistive heating energy is produced by superimposing a low-frequency alternating current of about 100 to 10,000 cycles/sec. upon a direct-current carrier. The high-frequency field ranges between substantially 0.1 and 100 megacycles/sec.

I have found that, surprisingly, advantageous results, with respect to the density of the sintered body, can be obtained when the current supplied to the electrodes is reduced to a relatively low value or cut off one or more times prior to termination of sintering. Moreover, the proper timing for the reduction in current is a function of the nature of the powdered metal to be sintered and can be determined by the change in the voltage current characteristic of the sintered body. In general, it may be said that the current can be initially reduced upon a sharp rise in the current passed through the body with increasing voltage. For relatively low-melting-point metals (such as bismuth, cadmium, lead or tin) the cut-off is effected at a relatively low positive value of $\partial I/\partial V$, the change of current with voltage, whereas metals melting at an intermediate range (e.g. iron, nickel, etc.) are subjected to a cutoff when the value of this differential reaches a maximum positive value. Cutoff for high-melting-point metals such as chromium, molybdenum, tungsten and iridium takes place when the differential attains a negative value or upon a decline in its positive value.

The above and other objects, features and advantages of the present invention will become more readily apparent from the following description, reference being made to the appended drawing in which.

Figures 6A, 6B, 6C:
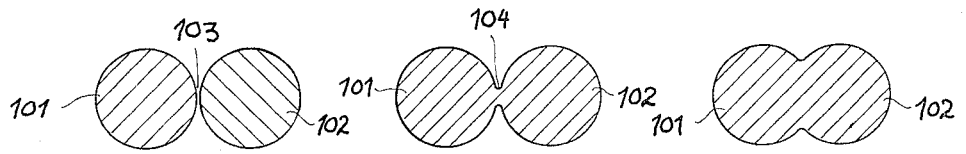
FIGS. 6A–6C are diagams illustrating the apparent steps of the present invention.

Referring first to FIGS. 6A–6C, it must be noted that two adjacent particles 101, 102 of a mass thereof are initially in light contacting relationship or spaced apart by a slight gap 103 so that the interparticle resistance is greater than the internal resistance of each particle. In this state, a pressure ranging between 0.1 and 5 kg./cm.$^2$ serves to hold the mass together, this pressure being derived from the weight of the particles themselves when they are loosely piled or being produced by the electrodes via hydraulic or mechanical means. Although gap 103 is shown to be relatively large, it must be understood that, in actuality, no physical separation of the adjacent particles need be present. Even when such particles contact each other lightly, the interfacial resistance is sufficiently high to sustain a momentary or repeated spark discharge thereacross. From FIG. 6B it may be seen that the spark discharge induced between the particles 101, 102 causes the formation of a conductive bridge 104 therebetween and a slight drawing together of the particles. When a high-frequency alternating current (from about 0.1–100 megacycles/sec.) is applied across the electrodes, the lattice structures of the particles are activated to promote the formation of the conductive bridges 104 between adjacent pairs of particles and a reorientation of the lattice. Continued passage of current through the particle mass promotes the bridging of other conductive particles while the essentially unidirectional current passing through the previously bridged particles is concentrated in the region of the bridges 104 to render the particles plastically deformable. Preferably prior to termination of the electric current and, in any event, before the plastically deformable portions of the particles have cooled, the entire mass is subjected to an elevated pressure (from about 6 to 1,000 kg./cm.$^2$), thereby forcing the particles into the condition illustrated diagrammatically in FIG. 6C. While only two particles have been shown in FIGS. 6A–6C, it must be emphasized that in the packed mass each particle can have 12 or more closest neighbors as a consequence of the microscopic irregularities so that the resulting body is substantially free from pores.

Figure 1:
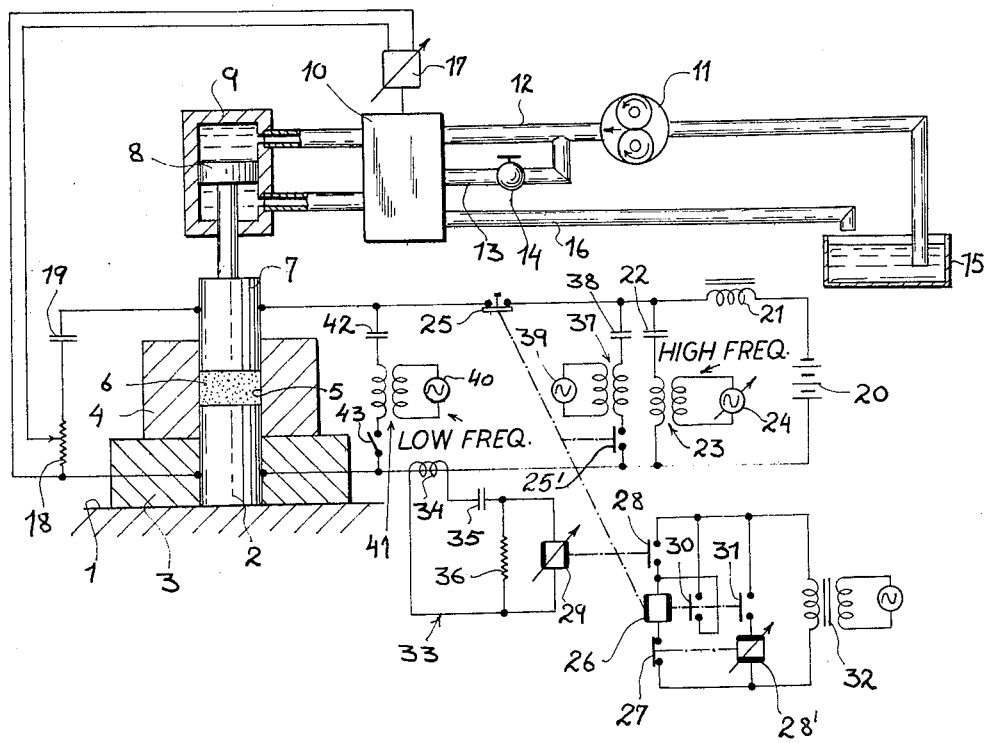
FIG. 1 is an axial cross-sectional view diagrammatically illustrating a system for the spark-discharge sintering of discrete electrically conductive particles into a coherent body, showing the circuit of the power-supply means therefor.

The apparatus illustrated in FIG. 1 comprises a support 1 upon which is mounted a cylindrical electrode 2 in an annular base 3, a refractory die 4 of ceramic material forming a chamber 5 with this electrode 2. The die chamber is filled with particles 6 which are slightly compacted by another electrode 7 affixed to a piston 8 of a hydraulic cylinder 9, energized via an electromagnetically operable control valve 10. Valve 10 is supplied from a pump 11 over a high-pressure conduit 12 and a low-pressure conduit 13, the latter being provided with a pressure-reducing valve 14. A reservoir 15 serves as a source of fluid for the pump 11 and receives fluid discharged from valve 10 over the return tube 16. Valve 10 is provided with an electromagnetic control device 17 whose input is tapped from a variable resistor 18 connected in series with a battery 19 across the electrodes 2, 7. The control element 17 may include a Wheatstone-bridge circuit in which the tapped portion of resistor 18 constitutes one branch, a voltage-responsive relay being connected across the output terminals of the bridge and having its contacts connected in series with the coil of the magnet controlling valve 11. In its normal position the valve supplies only sufficient fluid to cylinder 9 to maintain a pressure upon the mass 6 of particles ranging between 0.1 and 5 kg./cm.$^2$ this pressure being adjusted by the varying of the parameters of the bridge circuit of the adjustable control element 17. When a large number of conductive bridges are established between adjacent particles, the current increases sharply with a relatively small change in voltage and, at a level determined by the setting of the variable resistor 18, control element 17 shifts valve 10 to effect connection of the high-pressure line 12 with the cylinder 9 behind its piston 8. The pressure is thus sharply increased (i.e. to a level ranging between substantially 6 and 1,000 kg./cm.$^2$). The setting of resistor 18 is selected so as to trip valve 10 just prior to termination of the discharge and heating current, the elevated pressure being maintained until the particles have cooled and are once again in a plastically nondeformable state.

The spark discharge is produced across electrodes 2, 7 by means of a battery or other direct-current source 20 which provides the unidirectional current through the particle mass 6, this battery being connected in series with a pulse-shaping choke 21 having both ohmic and inductive impedance across a capacitor 22, adapted to discharge across the electrodes. The secondary winding of a transformer 23 is connected in series with capacitor 22 to superimpose upon the direct-current supply for the mass 6 the high-frequency power of a source 24, where variable frequency ranges between substantially 0.1 and 100 megacycles/sec. This high-frequency current expedites the formation of the aforementioned conductive bridges by resonance activation of the particle lattices and the subsequent reorientation of the lattice structure of the resulting body. A normally closed switch is provided in series with the aforedescribed spark source and the electrodes 2, 7, the switch being a back contact of a relay 26 whose winding is connected in circuit with the normally relay-closed contacts 27 of a time-delay relay 28' and the normally open contacts 28 of another time-delay relay 29.

Front contacts 30 of relay 26 provide a holding circuit with the winding of the latter, while another set of front contacts 31 is connected in series with the winding of relay 28 across a power transformer 32 serving as the source of electric current for relays 26 and 28. Relay 29 forms part of a sensing means or circuit responsive to the rate of change of current with voltage across the mass 6 (i.e. the current/voltage characteristics thereof) for sharply reducing the power supply to the electrodes 2, 7 at a predetermined point in the characteristic. The sensing circuit 33 includes a current transformer 34 whose output is connected across a differentiating network constituted by the capacitor 35 and a resistor 36 which can be simply the ohmic impedance of the winding of relay 29. The differentiating circuit responds to the differential $\alpha I/\alpha V$, across the particle mass and, when this differential achieves a predetermined level, operates relay 29. The latter, however, is of the adjustable-delay type, so that its contacts 28 can be set to close immediately (i.e. at a relatively low magnitude of the differential), or somewhat later at a time corresponding to a maximum positive value of the differential or, after a further period of time, at a point which the magnitude of the differential again decreases. When contacts 28 close, relay 26 is energized to close its holding contacts 30 and open switch 25, relay 28 being simultaneously actuated via contacts 31. The opening of switch 25 sharply cuts off the power supplied to the electrodes 2, 7 as required, the cut-off time being equal to the duration determined by the setting of relay 28 which then opens to restore relay 26 to its inactive state and thus again closes switch 25.

If desired, the reduction in power applied to the mass 6 can be carried out by disconnecting switch contact 25 and coupling a switch 25' with relay 26. Switch 25' can then be connected in series with the secondary winding of a transformer 37 and a D.C. blocking capacitor 38, a low-frequency alternating-current source 39 being provided across the primary winding of the transformer. This low-frequency network can have a half-wave amplitude substantially equal to the voltage of battery 20 so that, when switch 25' is closed, the voltage supplied across the electrodes 2, 7 by network 37, 38 effectively cancels out the voltage of battery 20 for at least several half cycles.

As previously described, it is frequently desirable to apply a low-frequency current to the electrodes 2, 7 to facilitate the resistive heating of the particles at their conductive bridges. In this case, an alternating current source 40 (having a frequency between substantially 100 and 10,000 cycles/sec. but preferably not greater than about 5,000 cycles/sec.), feeds the primary winding of a transformer 41 whose secondary winding is connected in circuit with a D.C. blocking capacitor 42 across the electrodes 2, 7. A switch 43 in series with this secondary winding permits the selective insertion or removal of this alternating-current source.

Figure 2:
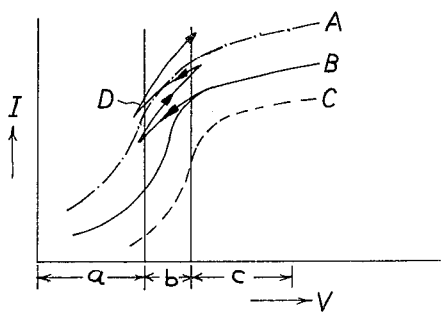
FIG. 2 is a graph illustrating the current/voltage characteristics of different particle masses.

In FIG. 2, I show a graph of the current plotted as the ordinate against the voltage as the abscissa for a mass 6 of different types of particles. Substantially all metal particles will have voltage characteristics of the type illustrated in the family of curves A, B, C. I have discovered that when relatively low-melting metals (i.e. bismuth, cadmium, lead, tin and their alloys) are sintered, it is best to cut off or sharply reduce the sintering power at stage $a$, a level at which the differential of current with respect to voltage is relatively small. When metals having moderate melting points (e.g. copper, silver, and their alloys) are sintered, it is best to effect the repeated cut-off at stages $b$ (see the repeated declines indicated at D), while high-melting point metals such as chromium, molybdenum, tungsten, iridium and the metals of the platinum family, together with their alloys, require sharp reductions in the applied current at stages $c$ although frequently such reductions in current can be effected at stage $b$.

Figure 5:
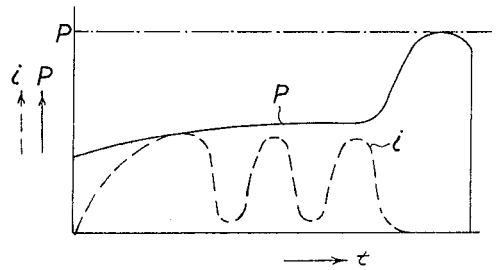
FIGS. 4 and 5 are graphs similar to FIG. 3 further illustrating the improved methods of the present invention.
Figure 4:
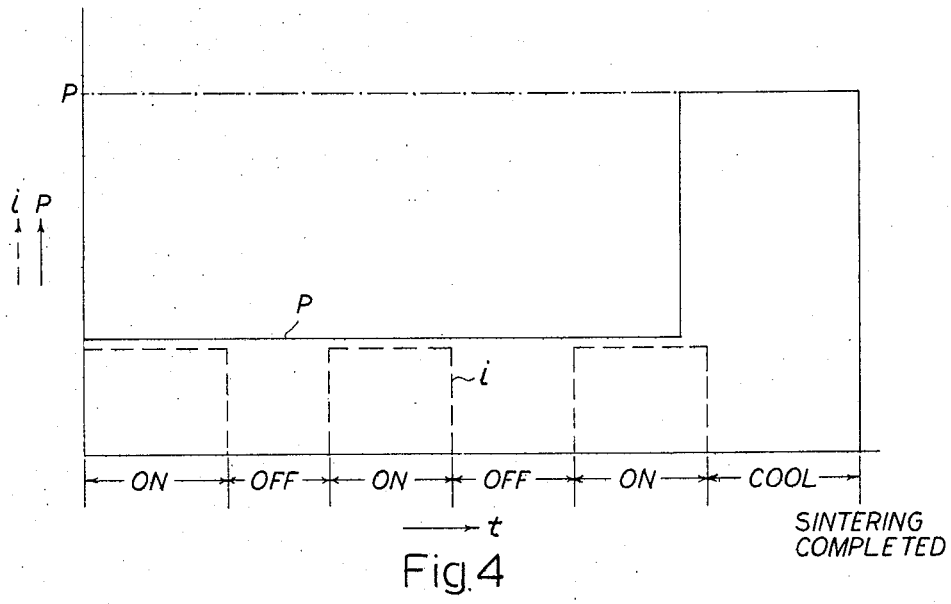
Figure 3:
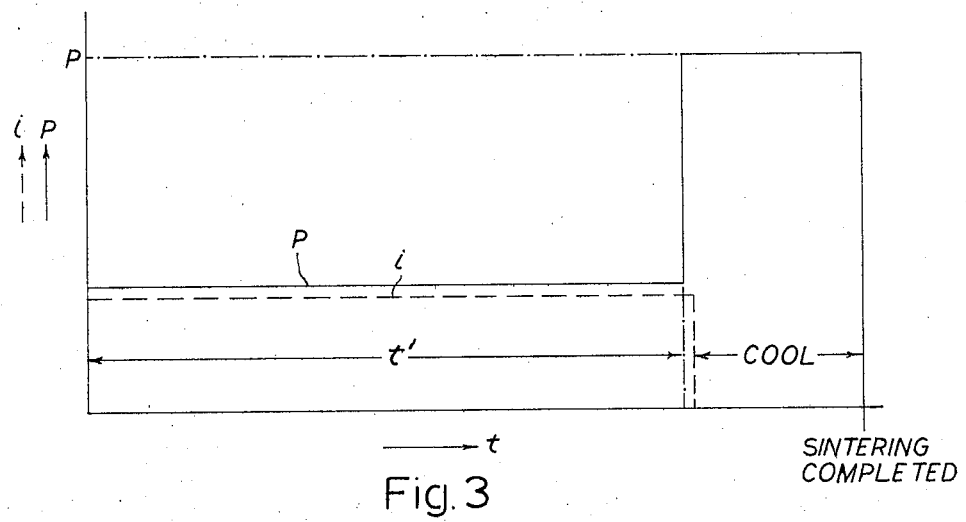
FIG. 3 is a simplified graph in which both current and pressure are plotted against time in a discharge-sintering process.

FIG. 3 illustrates diagrammatically the pressure P and current $i$ applied by the electrodes to the particle mass when no interruptions in current flow are made in the course of the process. From this graph it may be seen that the pressure P rises sharply after a period $t'$ just prior to cut-off of the current at time $t$. The elevated pressure is maintained until the particles cool to a temperature below that at which they are plastically deformable at pressures between 6 and 1,000 kg./cm.$^2$, i.e. for a period of several seconds. FIG. 4 shows how this pressure increase can be coupled with cut-off periods, it being noted that the power is interrupted twice during the sintering process. FIG. 5 shows an arrangement whereby the current is sharply reduced by superimposition of an alternating current upon the direct current of source 20.

EXAMPLE I

A nickel disk having a thickness of 5 mm. and a diameter of 20 mm. is produced by spark discharge through a mass of nickel powder having a particle size of approximately 2 microns. A mechanical pressure of 150 gr./cm.$^2$ is applied to the mass and a spark discharge of approximately 50 joules per discharge pulse is employed, this discharge terminating after a period of 15 seconds (i.e. 300 kilojoules total energy), whereby the particles are heated by the direct current and the low-frequency alternating current superimposed therein. The alternating current has a frequency of 5 kilocycles/sec. and a power approximately 60% of that of the direct current.

Additionally, a high-frequency field of approximately 3 megacycles/sec. was applied across the electrodes with a power of approximately 20 percent of that of the low frequency alternating current. The specific gravity of the resulting body ranged from 2.8–6.8, depending upon the location on the body at which the test was made when the high frequency was omitted. By utilizing the high-frequency field together with an increase in the pressure to 100 kg./cm.$^2$ at termination of sintering during the final three seconds, a uniform specific gravity of 8.82 was obtained. When high-frequency alternating current was not used but the power was cut off twice during this sintering operation, the body had a specific gravity of 78, this specific gravity being increased to about 8.8 when four cut-off periods were employed. When both power cut-off and pressure increase were used together with high-frequency alternating current, a specific gravity of over 99% of that of solid nickel was obtainable.

EXAMPLE II

The same parameters were employed with a cobalt powder having a particle size of approximately 10 microns except that the diameter of the sintered body was 15 mm. and the processing time 25 seconds. A specific gravity of 7.98 was obtained with a simple spark discharge in the absence of pressure elevation and superimposition of high-frequency alternating current, a specific gravity of 8.5 being obtained when the high-frequency A.C. (20 megacycles/sec.) was used together with an increase of pressure at the end of the 25 seconds to 250 kg./cm.$^2$. With the standard spark-sintering method but with two periods of power cut-off, a specific gravity of 8.3 was obtained. It was also possible to obtain a specific gravity of 8.7 when the power was cut off four times during the process. A specific gravity of 8.8 was produced when power cut-off (twice) was combined with elevation of pressure (500 kg./cm.$^2$) and the use of the above-indicated high-frequency alternating current.

EXAMPLE III

Again with parameters generally similar to those employed in Example I except that the body had a diameter of 10 mm. and required 20 seconds of sintering time, a mass of tungsten particles having a particle size of approximately 25 microns was sintered. The resulting body had a specific gravity of 17.8, this specific gravity being increased to 18.9 by the increase of pressure at termination of sintering to 800 kg./cm.$^2$ and the superimposition of a 50 megacycle/sec. high-frequency field upon the mass. The body sintered with power cut-of (twice) had a specific gravity of 18.8 while four periods of power cut-off yielded a specific gravity of 19.0. A specific gravity of 19.1 was obtained when the above-indicated high pressure and high frequency were used with four periods of power cut-off.

EXAMPLE IV

A mass of particles composed 90% of copper and 10% of carbon, the particle sizes ranging between 0.025 and 0.1 mm. was sintering at a pressure of approximately 50 gr./cm.$^2$ for a period of 20 seconds with a spark-discharge energy of 2500 joules, a low-frequency alternating current of 150 cycles/sec. being superimposed upon the direct current. The resulting body had a specific gravity of 6.6, this specific gravity being increased to 8.2 by the use of a superimposed high frequency of 0.5 megacycle/sec. and an elevated pressure of 10 kg./cm.$^2$ applied at the termination of sintering. When power was cut off twice, the body had a specific gravity of 7.4 and, upon four periods of cut-off, a specific gravity of 8.0.

EXAMPLE V

Under conditions similar to those of Example IV, a mass of particles composed 40% of lead and 60% of copper was sintered into a body 40 mm. in diameter and 5 mm. in thickness in 30 seconds. The resulting body had a specific gravity of 7.85, the specific gravity being 9.9 when the elevated pressure of 100 kg./cm.$^2$ was applied at the close of sintering while a high-frequency A.C. of one megacycle was superimposed upon the direct current during sintering. The body had a specific gravity of 8.3 when the power was cut off twice during the sintering operation and 9.3 when cut off four times.

EXAMPLE VI

A mass composed 96% of silver and 4% of cadmium oxide particles of the same size given in Example IV and under similar conditions was sintered into a body 10 mm. in diameter and 5 mm. in thickness in a period of 40 seconds. The resulting body had a specific gravity of 9.35. When a high-frequency alternating current field of 10 megacycles/sec. was superimposed and the pressure raised to 500 kg./cm.$^2$ at the close of sintering, the body had a specific gravity of 13.4. When the current was reduced to zero twice during the process, the body had a specific gravity of 10.2 while a specific gravity of 11.3 was obtained when this reduction in power was carried out four times.

EXAMPLE VII

A mass of particles having an average particle size of 5 megacycles was sintered for 50 seconds with a spark energy of approximately 3000 joules to produce a body having a diameter of 10 mm. and a thickness of 5 mm. The body was composed 35% of silver and 65% of tungsten and had a specific gravity of 11.5 when a low-frequency alternating current of 1 kilocycle/cm.$^2$ was superimposed upon the direct current. When high-frequency alternating current (25 megacycles/sec.) was additionally superimposed upon the A. C. source and the 4 kg./cm.$^2$ pressure raised to 750 kg./cm.$^2$ at the close of sintering, a specific gravity of 16.2 was obtained. When the current was cut off twice during sintering, the body had a specific gravity of 12.1 and, with four periods of cutoff, a specific gravity of 13.2 When four periods of power reduction, the afore-mentioned high frequency and elevated pressure were used, the specific gravity was 16.4.

The invention described and illustrated is believed to admit of many modifications within the ability of persons skilled in the art, all such modifications being considered within the spirit and scope of the appended claims.

What is claimed is:

1. A method of sintering discrete electrically conductive particles into a coherent body, comprising the steps of disposing said particles in a mass between a pair of electrodes and applying to said mass a relatively low pressure between substantially 0.1 and 5 kg./cm.$^2$; effecting an impulsive spark discharge between said electrodes through said mass to form conductive bridges between adjacent particles of said mass while applying an alternating current of substantially 100 cycles to 100 megacycles/sec. across said electrodes; passing an essentially unidirectional electric current through said mass upon the formation of said conductive bridges to resistively heat said particles at said bridges and render them plastically deformable; substantially reducing the magnitude of the electric current passed through said mass at least once; subjecting said mass of particles to an increased relatively high pressure between substantially 6 and 1000 kg./cm.$^2$ after said substantial reduction of said magnitude; and maintaining said high pressure to permit said mass to cool under said high pressure after termination of the passage of said electric current.

2. A method of sintering discrete electrically conductive particles into a coherent body, comprising the steps of disposing said particles in a mass between a pair of electrodes and applying to said mass a pressure between substantially 0.1 and 5 kg./cm.$^2$; effecting an impulsive spark discharge between said electrodes through said mass to form conductive bridges between adjacent particles of said mass; passing a direct current upon which is superimposed an alternating current having a frequency between substantially 100 and 10,000 cycles/sec. through said mass upon the formation of said conductive bridges to resistively heat said particles at said bridges and render them plastically deformable; and subjecting said mass of particles to an increased pressure between substantially 6 and 1,000 kg./cm.$^2$.

3. A method of sintering discrete electrically conductive particles into a coherent body, comprising the steps of disposing said particles in a mass between a pair of electrodes and applying to said mass a relatively low pressure between substantially 0.1 and 5 kg./cm.$^2$; effecting an impulsive spark discharge between said electrodes through said mass to form conductive bridges between adjacent particles of said mass while applying an alternating current of substantially 100 cycles to 100 megacycles/sec. across said electrodes; passing a direct current upon which is superimposed an alternating current having a frequency between substantially 100 and 10,000 cycles/sec. through said mass upon the formation of said conductive bridges to resistively heat said particles at said bridges and render them plastically deformable; subjecting said mass of particles to an increased pressure between substantially 6 and 1,000 kg./cm.$^2$ and terminating the passage of said electric current while maintaining said high pressure to permit said mass to cool under said high pressure.

4. A method of sintering discrete electrically conductive particles into a coherent body, comprising the steps of disposing said particles in a mass between a pair of electrodes and applying to said mass a relatively low pressure between substantially 0.1 and 5 kg./cm.$^2$; effecting an impulsive spark discharge between said electrodes through said mass to form conductive bridges between adjacent particles of said mass while applying a high-frequency alternating current of substantially 0.1 to 100 megacycles/sec. across said electrodes; subjecting said mass of particles to an increased relatively high pressure between substantially 6 and 1,000 kg./cm.$^2$ upon the formation of said conductive bridges and while said bridges are in a plastically deformable state; passing a direct current upon which is superimposed an alternating current having a frequency between substantially 100 and 10,000 cycles/sec. through said mass upon the formation of said conductive bridges to resistively heat said particles at said bridges and render them plastically deformable; substantially reducing the magnitude of the electric current passed through said mass at least once prior to the subjection thereof to said relatively high pressure; and terminating the passage of said electric current while maintaining said high pressure to permit said mass to cool under said high pressure.

5. A method of sintering discrete electrically conductive particles into a coherent body, comprising the steps of disposing said particles in a mass between a pair of electrodes, compressing said mass, and applying to the compressed mass a unidirectional electric current and an alternating current superimposed upon said unidirectional electric current while effecting an impulsive spark discharge between said electrodes, compressing said mass, and through the compressed mass to bond adjacent particles together.

6. A method of sintering discrete electrically conductive particles into a coherent body, comprising the steps of disposing said particles in a mass between a pair of electrodes, compressing said mass, and applying to the compressed mass a unidirectional electric current, a low-frequency alternating current and a high-frequency alternating current superimposed upon said unidirectional electric current while effecting an impulsive spark discharge between said electrodes, compressing said mass and through the compressed mass to bond adjacent particles together.

7. A method of sintering discrete electrically conductive particles into a coherent body, comprising the steps of disposing said particles in a mass between a pair of electrodes, compressing said mass, and applying to the compressed mass a unidirectional electric current, a low-frequency alternating current between substantially 100 and 10,000 cycles/sec. and a high-frequency alternating current between substantially 0.1 and 100 megacycles/sec. superimposed upon said unidirectional electric current while effecting an impulsive spark discharge between said electrodes, compressing said mass, and through the compressed mass to bond adjacent particles together.

8. Apparatus for sintering electrically conductive particles into a coherent body, comprising a pair of electrodes adapted to sandwich a mass of said particles between them with a relatively low initial pressure; means for applying an impulsive unidirectional electric current to said electrodes to effect an impulsive spark discharge therebetween to form conductive bridges among said particles; means connected across said electrodes for applying an alternating current thereto; and means for increasing the pressure applied to said mass upon the formation of said bridges.

References Cited by the Examiner

UNITED STATES PATENTS

| | | | |
|---|---|---|---|
| 1,896,854 | 2/1933 | Taylor | 75—226 |
| 2,227,176 | 12/1940 | Berghaus et al. | 75—221 |
| 2,227,177 | 12/1940 | Berghaus et al. | 75—224 |
| 2,948,609 | 8/1960 | Miller et al. | 75—214 |
| 3,182,102 | 5/1965 | Simnad | 75—226 X |

LEON D. ROSDOL, *Primary Examiner.*

REUBEN EPSTEIN, *Examiner.*

R. L. GOLDBERG, R. L. GRUDZIECKI,
*Assistant Examiners.*